United States Patent Office 3,064,313
Patented Nov. 20, 1962

3,064,313
PREPARATION OF FREE ACID CELLULOSE ETHER FILMS
Robert W. Butler, Wilmington, Del., assignor to Hercules Powder Company, Wilmington, Del., a corporation of Delaware
No Drawing. Filed June 14, 1960, Ser. No. 35,904
6 Claims. (Cl. 18—57)

The present invention relates to the manufacture of free acid carboxyalkyl cellulose films.

Although the present invention is applicable to the preparation of films starting with water-soluble salts of carboxyalkyl cellulose ethers, for the sake of clarity and simplicity the invention will be described hereinafter for the most part with reference to preparing films starting with water-soluble salts of carboxymethylcellulose, specifically water-soluble sodium carboxymethylcellulose.

There are a number of commercial applications where it is desirable to lay down a deposit, coating or film from a water system, and obtain a deposit, coating or film upon evaporation of the water which is then substantially insoluble in water, and yet which can subsequently be removed readily by treatment with aqueous alkali solutions if desired. Heretofore, attempts to prepare compositions having these characteristics have been deficient and uneconomical. It is known, for example, that a coating or film of sodium carboxymethylcellulose can be insolubilized after deposition from a water solution by surface treatment of the coating or film with a salt solution such as aluminum sulfate, or by surface treatment with a strong acid such as hydrochloric or sulfuric acid. Due to the dense nature of the deposited coating or film, such insolubilization treatment is necessarily confined to a very thin surface layer and does not extend uniformly throughout the deposited coating or film. Such films are rather water sensitive and tend to disintegrate in water. Moreover, such films are contaminated with salt impurities which cannot be satisfactorily removed by washing treatments. It is also known to prepare water-soluble films from free acid carboxymethylcellulose which has been prepared by ion exchange technique, but this too is quite unsatisfactory because it is very complicated and expensive. The ion exchange technique involves contacting an aqueous solution of sodium or other water-soluble salt of carboxymethylcellulose with a cation exchange resin in the free acid form. Essentially all of the cations present in the solution become attached to the cation exchange resin and the hydrogen ions supplied by the cation exchange resin become attached to the carboxymethylcellulose to form in situ the free acid form of carboxymethylcellulose as a stable aqueous colloidal dispersion. Films are cast from this dispersion and dried. The resin required for the ion exchange technique is expensive and must be regenerated frequently during use by means of a strong mineral acid in order to again place the resin in the free acid form so that it can be reused.

An object of the present invention is the preparation of free acid carboxyalkyl cellulose films. A further object is to provide a process of preparing free acid carboxymethylcellulose films, which process is characterized by simplicity and economy of operation. A still further object is to provide such a process wherein the film being prepared is of increased strength, thereby facilitating handling of the film during its preparation. The above and other objects will be apparent from the description of this invention given hereinafter.

The above and other objects are accomplished according to the present invention by carrying out the process which comprises acidifying a water-soluble salt of a carboxyalkyl cellulose ether having a D.S. of 0.3–0.5, forming films from the resulting acidified material, contacting the films with acid, and washing the films.

The following examples illustrate specific embodiments of the present invention, but these examples are not intended to limit the scope of the invention beyond that defined in the claims of this application. In the examples and elsewhere herein % is percent by weight unless otherwise indicated.

*Example 1*

In Example 1 an aqueous solution of sodium CMC was acidified and films were formed from the acidified solution by casting on glass plates. Immediately after casting, the films were immersed in an HCl solution 17% concentration and soaked for 5 minutes. Then the films were immersed in an HCl solution of 2% concentration and soaked for 5 minutes. Thereafter the films were washed 5 times in distilled water by immersing the films in fresh water each time and allowing to soak for 10 minutes per wash. Then the films were dried at 70° C. Further details appear in Table 1 hereinafter.

*Example 2*

In Example 2 an aqueous solution of NaCMC was acidified and films were formed from the acidified solution by casting on glass plates. Next the films were dried at 70° C. The dried films were immersed in an HCl solution of 1% concentration and allowed to soak for 30 minutes. Then the films were washed 3 times in distilled water by immersing in fresh water each time and allowing to soak for 20 minutes per wash. The water-washed films were dried at 70° C. Further details appear in Table 1 hereinafter.

*Example 3*

In Example 3, Example 1 above was repeated substantially, except that the D.S. of the sodium CMC used was 0.30 and its 2% aqueous solution before casting into films was acidified to 3.0 pH with sulfuric acid. The strength properties of the film were approximately the same as those given in Table 1 hereinafter for Example 1.

*Example 4*

In Example 4, Example 1 above was repeated substantially, except that the D.S. of the sodium CMC used was 0.50 and its 2% aqueous solution before casting into films was acidified to 5.0 pH with nitric acid. The strength properties of the film were approximately the same as those given in Table 1 hereinafter for Example 1.

As controls, Examples 1–4 above were repeated substantially, except that the pH of the solution from which the films were cast was 7.0. In each of these control experiments the films were so weak that they broke up before the acid wash could be completed, whereas in Examples 1-4 above the films held together well during processing.

TABLE 1

| Example No. | Cellulose Ethers | | | Acidification [1] | | Film Properties | | | |
|---|---|---|---|---|---|---|---|---|---|
| | Name | D.S. | Percent Solids in Aq. Soln. | pH | Acid | Wet, Thickness, mils | Dry | | Wet, Tensile, p.s.i. |
| | | | | | | | Tensile, p.s.i. | Elongation, Percent | |
| 1 | NaCMC | 0.37 | 2.0 | 3.5 | HCl | 100 | 5,070 | 1.3 | 1,040 |
| 2 | NaCMC | 0.37 | 2.5 | 3.9 | HCl | 60 | 11,100 | 7.0 | 2,200 |

[1] Acidification of aqueous solution of cellulose ether salt before forming the films.

From the above examples it will be readily apparent that the present invention provides a quite simple and economical process of making films of carboxyalkyl cellulose ethers in the free acid form starting with water-soluble salts of said ethers.

As those skilled in this art will appreciate, a number of modifications may be made in the invention as described within the scope of the appended claims. Some of these modifications will now be discussed.

While the water-soluble sodium salts of carboxyalkyl cellulose ethers will normally be used because of ready availability, all water-soluble salts of carboxyalkyl cellulose ethers are applicable. These include, by way of example, the alkali metal salts (e.g., sodium and potassium) and the ammonium salts.

Degree of substitution (D.S.) is the average number of hydroxylic hydrogens per anhydroglucose unit (i.e., the cellulose molecule repeating unit) replaced or substituted by the carboxyalkyl radical. There are three hydroxylic hydrogens per anhydroglucose unit; therefore, the greatest D.S. possible is three. The D.S. of the carboxyalkyl cellulose ether salt is important and must be within a very narrow range. The lower D.S. is limited to the minimum D.S. at which the carboxyalkyl cellulose ether salt is substantially water soluble. The upper D.S. is limited to the maximum D.S. at which the carboxyalkyl cellulose ether salt solution gives films of enough strength for processing according to this invention. These D.S. limitations will vary somewhat but not appreciably depending upon the particular carboxyalkyl cellulose ether salt used and its uniformity of substitution. When using sodium carboxymethylcellulose I have found the operable D.S. range to be 0.3–0.5, preferably 0.35–0.45. The sodium carboxymethylcellulose used in the examples was sodium carboxymethylcellulose which is commercially available and designated in the trade as "Hercules CMC4."

The pH to which the solution of carboxyalkyl cellulose ether salt is acidified prior to film-making may vary widely and is important only within very wide limitations. The limitation on minimum pH is economy. Of course, the pH must be reduced enough to convert a substantial portion of the ether salt to the free acid form. The pH used will depend on the process used to prepare the films, since such process in turn will in large part determine the strength requirement of the films in order to be able to manufacture them according to this invention. The examples hereof show practicing this invention satisfactorily using a pH of 3-5 starting with sodium carboxymethylcellulose. The pH may vary somewhat from this range. However, if one substantially exceeds a pH of 5 with most processes of making the films, he would be apt to encounter the difficulty of insufficient strength for the films to hold together during preparation. On the other hand, if the pH is much below 3, the carboxymethylcellulose may tend to precipitate out of solution.

Although acids in general are applicable for the acidification prior to film preparation and also for washing, one will usually prefer to use mineral acids because of the ease of removing the salt ions.

Various additives, including plasticizers, may be used in the films, and these may be added at any stage of the process desired. However, if the additive is substantially soluble in the acid wash bath or the water wash bath, it should be added after these steps. For instance, the film can be plasticized after the water wash and prior to drying by contacting it with a bath containing the plasticizer.

If films of still greater water resistance are desired, the films can be coated with various materials as is well known in this art. For instance, coating the films with nitrocellulose increases their water resistance and also renders them heat-sealable.

While it is possible to employ a nonaqueous system in making films according to the present invention, an aqueous system is by far more practical and will normally be used. The concentration of the carboxyalkyl cellulose ether salt in such system is not critical and anyone skilled in this art will know that concentration to use to best suit his particular needs.

The means of forming the films are not per se a part of the present invention. There are a number of well known film-forming means, one of which includes extruding a film-forming material into an acid bath, passing the acid treated films through a water bath and then drying the films by passing them through an oven at an elevated temperature. Likewise, neither is the temperature of drying the films per se a part of the present invention. As the art well knows, various drying conditions may be used depending in part on the film material being dried, the thickness of the films, etc.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Process of preparing films of carboxyalkyl cellulose ethers in the free acid form which comprises acidifying to pH 3-5 a water-soluble salt of a carboxyalkyl cellulose ether having a D.S. of 0.3-0.5, forming films from the resulting acidified aqueous solution of said water-soluble salt of a carboxyalkyl cellulose ether, and removing salt ions from the films by contacting the films with acid and washing the films, and finally drying the film.

2. Process of preparing films of carboxymethylcellulose in the free acid form which comprises acidifying to pH 3-5 an aqueous solution of a water-soluble salt of carboxymethylcellulose having a D.S. of 0.3-0.5, forming films from the resulting acidified aqueous solution of said water-soluble salt of carboxymethylcellulose drying the films, removing salt ions from the films by contacting the dried films with acid and washing the films, and drying the washed films.

3. Process of preparing films of carboxymethylcellulose in the free acid form which comprises acidifying to pH 3-5 an aqueous solution of sodium carboxymethylcellulose having a D.S. of 0.3-0.5, forming films from the resulting acidified aqueous solution of sodium carboxymethylcellulose, and removing salt ions from the films by contacting the films with acid and washing the films, and finally drying the films.

4. Process of preparing films of carboxymethylcellulose in the free acid form which comprises acidifying to pH 3–5 an aqueous solution of sodium carboxymethylcellulose having a D.S. of 0.35–0.45, forming films from the resulting acidified aqueous solution of sodium carboxymethylcellulose, and removing salt ions from the films by contacting the films with acid and washing the films, and finally drying the films.

5. Process of preparing films of carboxymethylcellulose in the free acid form which comprises acidifying to pH 3–5 an aqueous solution of sodium carboxymethylcellulose having a D.S. of 0.3–0.5, forming films of the resulting acidified solution of sodium carboxymethylcellulose and removing salt ions from said films by extruding same into an acid bath and washing the films, and finally drying the resulting films.

6. Process of preparing films of carboxymethylcellulose in the free acid form which comprises acidifying to pH 3–5 an aqueous solution of sodium carboxymethylcellulose having a D.S. of 0.35–0.45, forming films of the resulting acidified solution of sodium carboxymethylcellulose and removing salt ions from said films by extruding same into an acid bath and washing the films and finally drying the resulting films.

References Cited in the file of this patent

UNITED STATES PATENTS

| | | |
|---|---|---|
| 1,682,293 | Lilienfeld | Aug. 28, 1928 |
| 2,420,949 | Hager et al. | May 20, 1947 |
| 2,495,767 | Reid et al. | Jan. 31, 1950 |
| 2,668,120 | Leaf et al. | Feb. 2, 1954 |

OTHER REFERENCES

Gardner, Circular 688 — Sodium Carboxymethylcellulose, August 1944, pages 191–194.

Hercules CMC Cellulose Gum, 1949, 8 pages.

Brown and Haughton: "The Chemical and Physical Properties of CMC," Jour. Soc. Chem. Ind.; October 1941, pages 254-258.

Hercules CMC Cellulose Gum, 1951, 20 pages.

High Polymers, vol. V, "Cellulose," Part II, Ott and Spurlin, 1954, pages 938, 944 and 945; copy in Sci. Lib.